(12) United States Patent
Park et al.

(10) Patent No.: US 9,504,074 B2
(45) Date of Patent: Nov. 22, 2016

(54) METHOD OF PROVIDING PROXIMITY SERVICE COMMUNICATION BETWEEN TERMINALS SUPPORTING PROXIMITY SERVICE COMMUNICATIONS

(71) Applicant: Electronics and Telecommunications Research Institute, Daejeon (KR)

(72) Inventors: Hyunho Park, Daejeon (KR); Hyeong Ho Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 123 days.

(21) Appl. No.: 14/191,303

(22) Filed: Feb. 26, 2014

(65) Prior Publication Data

US 2014/0273850 A1 Sep. 18, 2014

(30) Foreign Application Priority Data

Mar. 15, 2013 (KR) .................. 10-2013-0027856
Jul. 9, 2013 (KR) .................. 10-2013-0080172

(51) Int. Cl.
*H04W 76/02* (2009.01)
*H04W 4/00* (2009.01)
*H04W 36/00* (2009.01)

(52) U.S. Cl.
CPC .......... *H04W 76/023* (2013.01); *H04W 4/008* (2013.01); *H04W 36/0022* (2013.01)

(58) Field of Classification Search
CPC .......... H04W 36/0022; H04W 8/005; H04W 4/005; H04W 88/06; H04W 76/023; H04W 76/021; H04W 28/10; H04L 63/0428; H04L 67/104; H04J 3/26; H04J 3/1694
See application file for complete search history.

(56) References Cited

U.S. PATENT DOCUMENTS

| | | | |
|---|---|---|---|
| 2006/0148516 A1 | 7/2006 | Reddy et al. | |
| 2009/0017807 A1* | 1/2009 | Kwon et al. | 455/416 |
| 2012/0166671 A1* | 6/2012 | Qi et al. | 709/236 |
| 2013/0301438 A1* | 11/2013 | Li et al. | 370/252 |
| 2014/0003237 A1* | 1/2014 | Kenney et al. | 370/235 |
| 2014/0022986 A1* | 1/2014 | Wu et al. | 370/328 |
| 2014/0115058 A1* | 4/2014 | Yin et al. | 709/204 |

FOREIGN PATENT DOCUMENTS

| | | |
|---|---|---|
| KR | 10-2010-0010946 A | 2/2010 |
| WO | WO 2007/044597 A2 | 4/2007 |

* cited by examiner

*Primary Examiner* — Ping Hsieh
*Assistant Examiner* — James Yang

(57) ABSTRACT

The present invention relates to a method of providing proximity service communication between terminals. In accordance with an embodiment, a first terminal makes connection to a second terminal with network assistance. The first terminal requests information required to search for the second terminal from a network management server. The network management server determines a communication mode for proximity service communication. The network management server transmits a request message requesting communication between the first terminal and the second terminal in the communication mode to the first and second terminals. In accordance with another embodiment, a first terminal may switch its proximity service communication technology for better QoS without network assistance. The first terminal monitors link status. If the link status is deteriorated, the first terminal requests a second terminal to change proximity service communication technology. The first and the second terminal switch their proximity service communication technologies.

9 Claims, 7 Drawing Sheets

METHOD OF PROVIDING PROXIMITY SERVICE COMMUNICATION BETWEEN TERMINALS SUPPORTING PROXIMITY SERVICE COMMUNICATIONS

CROSS REFERENCE TO RELATED APPLICATIONS

This application claims the benefit of Korean Patent Application Nos. 10-2013-0027856 filed on Mar. 15, 2013 and 10-2013-0080172 filed on Jul. 9, 2013, which are hereby incorporated by reference in their entireties into this application.

BACKGROUND OF THE INVENTION

1. Technical Field

The present invention relates generally to a method of providing proximity service communication between terminals supporting multi-radio access technology and, more particularly, to a method of providing proximity service communication between terminals by performing direct communication between terminals or locally routed communication via an identical base station.

2. Description of the Related Art

In 3rd Generation Partnership Project (3GPP) Service and System Aspects (SA), communication based on proximity between terminals is provided under the name of "Proximity Service (ProSe)." For this, communication between terminals is provided either using no network infrastructure for data transmission or using a minimum network infrastructure such as only a base station. Network infrastructure in this patent means network entities providing communication services for terminals and managing communication networks.

ProSe is intended to support commercial services, social networking, network offloading, etc. ProSe includes direct communication between terminals (direct mode) and locally routed communication via an identical base station (locally routed mode).

In addition to the ProSe of 3GPP, technologies and standards related to direct communication between terminals include FlashLinQ of Qualcomm, Wi-Fi Direct of WiFi Alliance, IEEE 802.15.8 Peer Aware Communication (PAC) of IEEE, etc.

FlashLinQ, which is technology for direct communication between terminals in a licensed band, is capable of providing communication between terminals within the range of 1 mile (1.6 km), and has the field of applications, such as in social networking and advertising services.

IEEE 802.15.8 PAC is under standardization to provide social networking, advertising, games, etc. between users within the range of 1 km.

Wi-Fi Direct is direct communication using an unlicensed band between terminals, each having a wireless local area network (Wi-Fi or WLAN) interface.

In addition, as a standard related to proximity service communication, IEEE 802.11aq Pre-Association Discovery (PAD) is under standardization.

IEEE 802.11aq PAD is intended to standardize communication between a WLAN terminal and a counterpart WLAN access point before the WLAN terminal is associated with the WLAN access point.

Since network infrastructures used in IEEE 802.11aq are only access network resources such as WLAN access points and servers connected to the WLAN access points (for example, a printer server, a web server, a file server, etc.), IEEE 802.11aq may be considered as proximity service communication in a broad sense.

Research into proximity service communication is currently being conducted based on schemes for searching for proximity service communication-supporting terminals and searching for proximity-based services, on the basis of single radio access technology, but research into proximity service communication in heterogeneous networks for providing multi-Radio Access Technology (RAT) has yet been sufficiently conducted.

If proximity service communication is assisted by heterogeneous networks, proximity service communication can reduce load of wireless/wired networks and provide various communication services.

Meanwhile, a traffic load distribution scheme based on a conventional network infrastructure has limitations. That is, a traffic load can be distributed to other networks only when a network infrastructure, such as a base station, is present. Even if two terminals use the same base station, they communicate with each other through a core network, and thus a burden on the core network is increased.

Further, research into switching between the use of proximity service communication and the use of a network infrastructure is not sufficient.

If a distance between terminals is increased, or if it is difficult to perform proximity service communication due to hindrance such as radio interference, the network infrastructure must be used again, but methods of switching to the use of the network infrastructure without releasing a connection between the terminals have not yet been desirably described.

For example, when two terminals, which are performing proximity service communication via Wi-Fi Direct, become far away from each other due to the movement thereof, the use of a Long Term Evolution (LTE) infrastructure is required again. In this case, a delay time required to switch to the use of the LTE infrastructure must be minimized.

Further, it is difficult to select suitable radio access technology necessary for communication with a neighboring terminal.

For proximity service communication, terminals must use the same radio access technology, but it is difficult to know which radio access technology can be used by the two terminals without network assistance. For example, when terminal 1 can use FlashLinQ and ProSe, and terminal 2 can use ProSe and Wi-Fi Direct, it is difficult for the two terminals to simultaneously select ProSe without the aid of a network infrastructure.

Meanwhile, it is also difficult to search for a terminal or a server for proximity service communication. Also, it is difficult to search for a terminal or a server providing communication services desired by a user via proximity service communication. For example, in order to search for a terminal that provides proximity service communication without the aid of a network infrastructure, significant time may be required.

As another example, when a user desires to receive specific video content via proximity service communication, it may be difficult to search for a terminal containing the video content using only proximity service communication without the aid of a network infrastructure.

Further, it is difficult to search for a service meeting a user's requirement using only proximity service communication. At the present time, although schemes for providing local information for proximity service communication have been presented, such local information is randomly transferred in general to users regardless of whether the users need the local information. For example, if information about business wear shoes is received via proximity service communication although a user desires information about sport shoes, the user may feel inconvenienced due to unnecessary advertisements.

SUMMARY OF THE INVENTION

Accordingly, the present invention has been made keeping in mind the above problems occurring in the prior art, and an object of the present invention is to provide a method of providing proximity service communication between terminals supporting multi-Radio Access Technologies (RATs), which can smoothly perform proximity service communication between terminals supporting multi-RATs.

Objects of the present invention are not limited to the above-described object, and other objects not described here will be more clearly understood by those skilled in the art from the following detailed description.

In accordance with an aspect of the present invention to accomplish the above object, there is provided a method of providing proximity service communication between terminals supporting multi-Radio Access Technologies (RATs), including requesting, by a first terminal connected to a first access network, information required to search for a target terminal from a network management server, transmitting, by the network management server, information about the target terminal selected based on the requested information to the first terminal, determining, by the network management server, a communication mode for proximity service communication between the first terminal and a second terminal that is the target terminal connected to a second access network, if the communication mode between the first terminal and the second terminal has been determined, transmitting, by the network management server, a first request message requesting communication between the first terminal and the second terminal in the determined communication mode to the first terminal and to the second terminal, and receiving a first response message to the request message from the first terminal and the second terminal.

Preferably, the first request message may include at least one of identifier information of the first terminal or the second terminal, information about the communication mode, information about proximity service communication technology between the first terminal and the second terminal, and identifier information of an identical base station.

Preferably, the communication mode may be one of a first communication mode required to perform direct communication between the first terminal and the second terminal and a second communication mode required to perform locally routed communication between the first terminal and the second terminal via an identical base station.

Preferably, the method may further include requesting, by the network management server, information about proximity service communication technology supported by the first terminal and the second terminal from the first terminal and the second terminal, receiving, by the network management server, the information about the proximity service communication technology supported by the first terminal and the second terminal from the first terminal and the second terminal, and determining, by the network management server, the communication mode between the first terminal and the second terminal, based on the received proximity service communication technology information.

Preferably, the method may further include, if the communication mode is the second communication mode, transmitting, by the network management server, a second request message requesting communication relay between the first terminal and the second terminal to the identical base station that will relay communication between the first terminal and the second terminal, and receiving, by the network management server, a second response message corresponding to the second request message from the identical base station.

Preferably, the second request message may include identifier information of the first terminal and the second terminal.

Preferably, the location information of the first terminal and the second terminal may include at least one of Global Positioning System (GPS) location information, identifier information of a radio base station to which the first and second terminals are connected.

Preferably, the measurement results may be generated by measuring strengths of the signals transmitted/received between the first terminal and the second terminal.

Preferably, the first access network and the second access network may be networks with different radio access technologies.

Preferably, the information required to search for the target terminal may include at least one of location information of the first terminal, information about proximity service communication technology of the first terminal, and service information requested by the first terminal.

Preferably, the information about the target terminal may include identifier information and access network information of the target terminal.

In accordance with an aspect of the present invention to accomplish the above object, there is provided a method of providing proximity service communication between terminals, including monitoring, by a first terminal, link status of current communication technology being used for proximity service communication between the first terminal and a second terminal, detecting, by the first terminal, that the link status of the current communication technology is deteriorated, if the first terminal detects the link status of the current communication technology is deteriorated, finding, by the first terminal, new communication technology to be used for proximity service communication between the first terminal and the second terminal and requesting, by the first terminal, the second terminal to switch from the current communication technology to the new communication technology for proximity service communication.

Preferably, the method may further include, connecting, by the first terminal, to the second terminal by using the new communication technology and communicating, by the first terminal, with the second terminal by using the new communication technology.

DESCRIPTION OF THE PREFERRED EMBODIMENTS

Objects and effects of the present invention and technical configurations to accomplish them will be described in detail with reference to the following embodiments together with the attached drawings. In the following description, detailed descriptions of related known elements or functions that may unnecessarily make the gist of the present invention obscure will be omitted. The terms described later in the present specification are defined in consideration of structures, roles, and functions in the present invention and may vary depending on the intention or usage of a user or an operator.

However, the present invention is not limited by the following embodiments and may be implemented in various forms. The present embodiments are configured to merely make the disclosure of the present invention complete and are provided to fully describe the scope of the present invention to those having ordinary knowledge in the art to which the present invention pertains, and the present invention is merely defined by the scope of the accompanying claims. Therefore, the definition of the scope should be made based on the entire content described in the present specification.

In the entire specification, an expression indicating that a first component "includes" a second component means that the first component may further include other components without excluding other components unless a description to the contrary is specifically pointed out in context.

Hereinafter, a method of providing proximity service communication between terminals supporting multi-Radio Access Technology (RAT) according to embodiments of the present invention will be described in detail with reference to the attached drawings.

Figure 1:
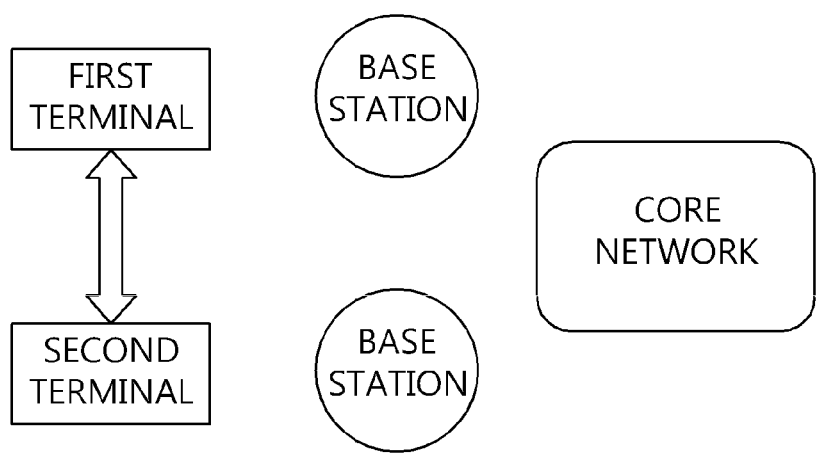
FIG. 1 is a configuration diagram showing a system for providing proximity service communication between terminals supporting multi-RATs according to a first embodiment of the present invention.
Figure 2:
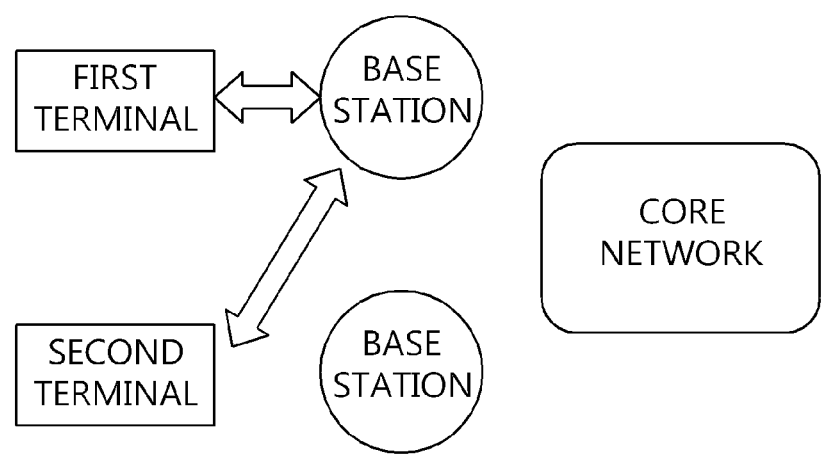
FIG. 2 is a configuration diagram showing a system for providing proximity service communication between terminals supporting multi-RATs according to a second embodiment of the present invention.

FIG. 1 is a configuration diagram showing a system for providing proximity service communication between terminals supporting multi-RATs (or multi-RATs terminals) according to a first embodiment of the present invention, and FIG. 2 is a configuration diagram showing a system for providing proximity service communication between terminals supporting multi-RATs according to a second embodiment of the present invention.

For the convenience of description, the embodiments of the present invention will be described such that, as shown in FIG. 1, the first embodiment assumes a case where communication between terminals is performed in a direct mode (a first communication mode) for performing direct communication between the terminals, and such that, as shown in FIG. 2, the second embodiment assumes a case where communication between terminals is performed in a locally routed mode via an identical base station (a second communication mode) for performing communication via a separate base station or access point.

Below, the first embodiment in which communication between terminals is performed in the first communication mode (direct communication between terminals) will be described.

Figure 3:
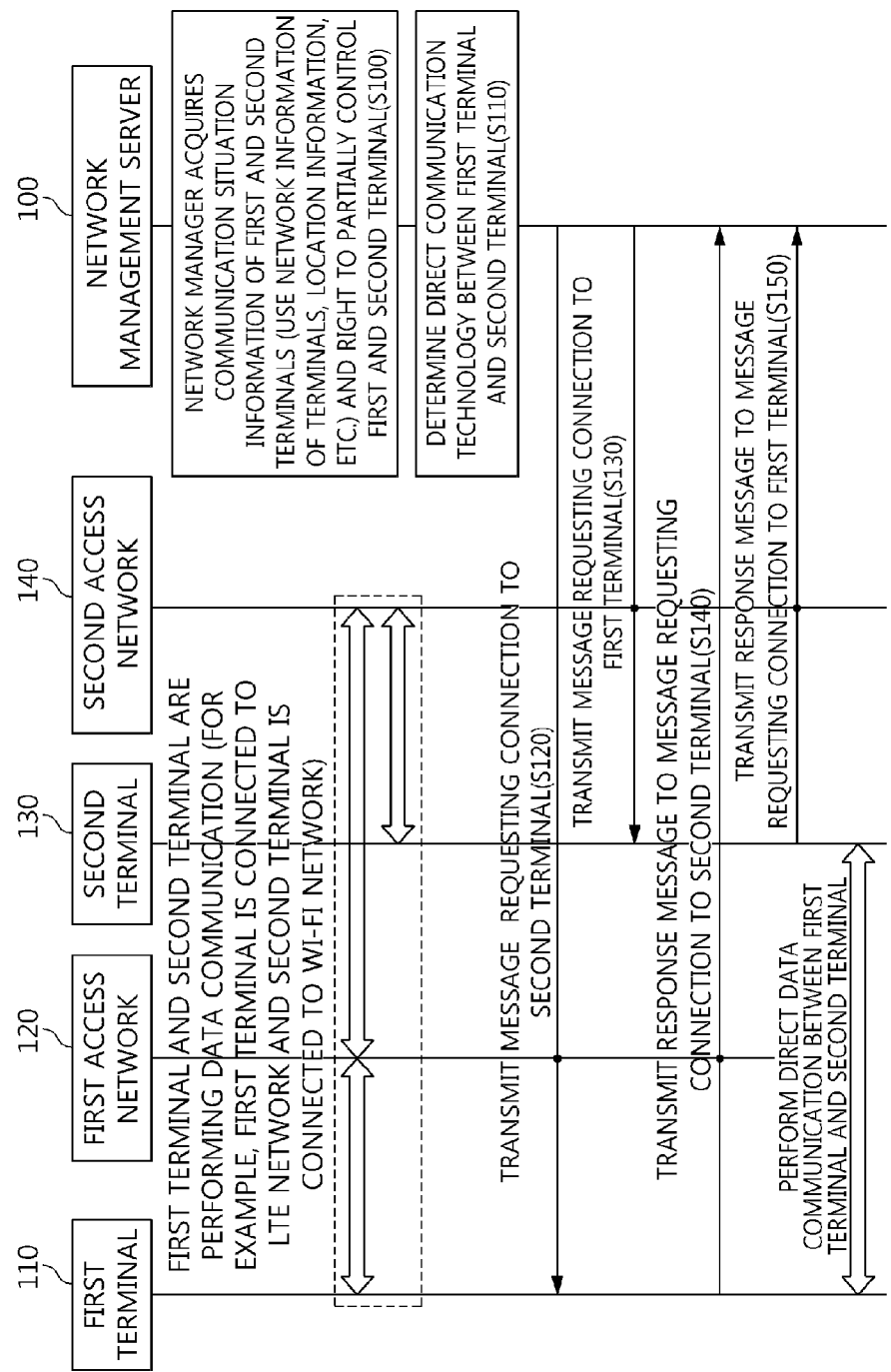
FIG. 3 is a flow diagram showing a method of providing proximity service communication between terminals supporting multi-RATs according to a first embodiment of the present invention.

FIG. 3 is a flow diagram showing a method of providing proximity service communication between terminals supporting multi-RATs according to a first embodiment of the present invention.

The system for performing the method includes a network management server 100 for managing a network, a first terminal 110, a first access network 120 to which the first terminal is connected, a second terminal 130, and a second access network 140 to which the second terminal is connected. The network management server 100 may be, for example, a Media Independent Information Service (MIIS) server in IEEE 802.21 Media Independent Handover (MIH).

The first terminal 110 and the second terminal 130 are assumed to be currently performing data communication over the first access network 120 and the second access network 140, respectively.

In this case, the first access network 120 and the second access network 140 may be networks with different radio access technologies in such a way that the first access network 120 is an LTE network and the second access network 140 is a Wi-Fi network. However, these are merely examples, and the networks of the invention are not limited to such examples.

First, the network management server 100 acquires the communication situation information of the terminals 110 and 130 and the right to partially control the terminals 110 and 130 at step S100. In this case, the communication situation information may include information about networks used by the terminals 110 and 130, the location information of the terminals, etc.

The information about the networks used by the terminals 110 and 130 may be information related to Radio Access Technology (RAT) for the connected networks, a connected radio base station, the Quality of Service (QoS) of the access networks, and other pieces of information about the access networks and core networks.

Meanwhile, the location information of the terminals 110 and 130 may be one of Global Positioning System (GPS) location information, place-related information (for example, address and place name, such as "XX hotel"), and identifier information of the connected radio base station. As occasion demands, other pieces of information required for wired/wireless communication may be the communication situation information.

The right to partially control the terminals 110 and 130, acquired by the network management server 100, may include the right to control the selection of the access networks of the terminals 110 and 130 or the selection of proximity service communication of the terminals 110 and 130.

The network management server 100 determines which one of the first communication mode and the second communication mode is to be used when proximity service communication between the first terminal 110 and the second terminal 130 is performed at step S110.

For this, the network management server 100 must determine whether the same direct communication technology can be used between the terminals. For example, when the first terminal 110 supports ProSe and Wi-Fi Direct technology, and the second terminal 130 supports Wi-Fi Direct and PAC technology, the two terminals 110 and 130 may perform direct communication there between only when using the Wi-Fi Direct technology.

Therefore, the network management server 100 must be able to inquire of the terminals about which direct communication technology is usable.

Figure 4:
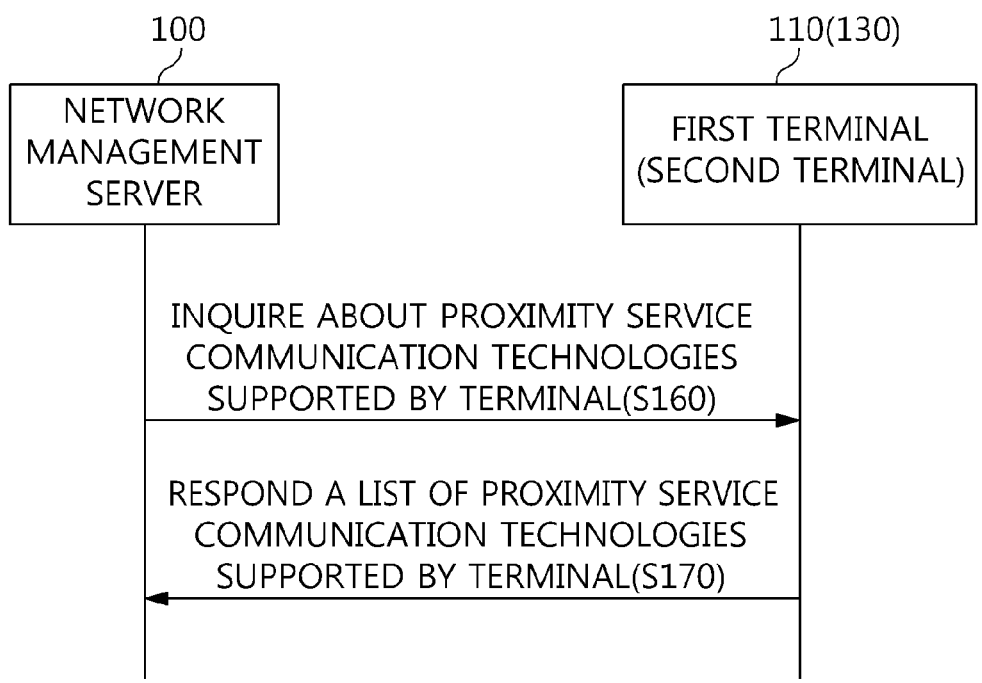
FIG. 4 is a flow diagram showing a method of determining direct communication technology between terminals in the method of providing proximity service communication between terminals supporting multi-RATs according to the first embodiment of the present invention.

FIG. 4 is a flow diagram showing a method of requesting direct communication technology supported by each terminal in the method of providing proximity service communication between terminals supporting multi-RATs according to the first embodiment of the present invention. As shown in FIG. 4, the network management server 100 inquires of the first terminal 110 and the second terminal 130 about proximity service communication technology (direct communication or locally routed communication via an identical base station) supported by the terminals at step S160. For example, the network management server 100 transmits a MIH_ProSe_TechList request message to the first terminal 110 and to the second terminal 130 through the first access network 120 and the second access network 140 which are heterogeneous networks, thus requesting information about proximity service communication technology supported by the terminals.

When the first terminal 110 and the second terminal 130 receive inquiries about proximity service communication technology from the network management server 100, each of the first terminal 110 and the second terminal 130 responds to the inquiry in the form of a list of proximity service communication technologies supported by the terminal at step S170. For example, when the first terminal 110 and the second terminal 130 receive the MIH_ProSe_TechList request message, each terminal provides a list of proximity service communication technologies supported thereby to the network management server 100 in the form of a MIH_ProSe_TechList response message.

Further, the network management server 100 may use the location information of terminals so as to determine a communication mode between the terminals. In this case, as the location information, location information of the terminals may be estimated using GPS location information of the terminals. Alternatively, the location information of each terminal may be the identifier of the radio base station. If the terminals currently access the same radio base station, direct communication between the terminals may also be possible.

Further, information about a place at which each terminal is currently located may also be the location information of the terminal. For example, if pieces of information about the places at which two terminals are currently located are identical. For example, "XX department store," direct communication between the terminals may be possible. Schemes for providing place information through a Wi-Fi network are described in IEEE 802.11u.

Meanwhile, if a certain terminal requests the counterpart terminal for direct communication to transmit a terminal identification signal for direct communication (for example, a beacon signal for Wi-Fi Direct) and measures the strength of the signal, the terminal may determine whether direct communication is possible.

Figure 5:
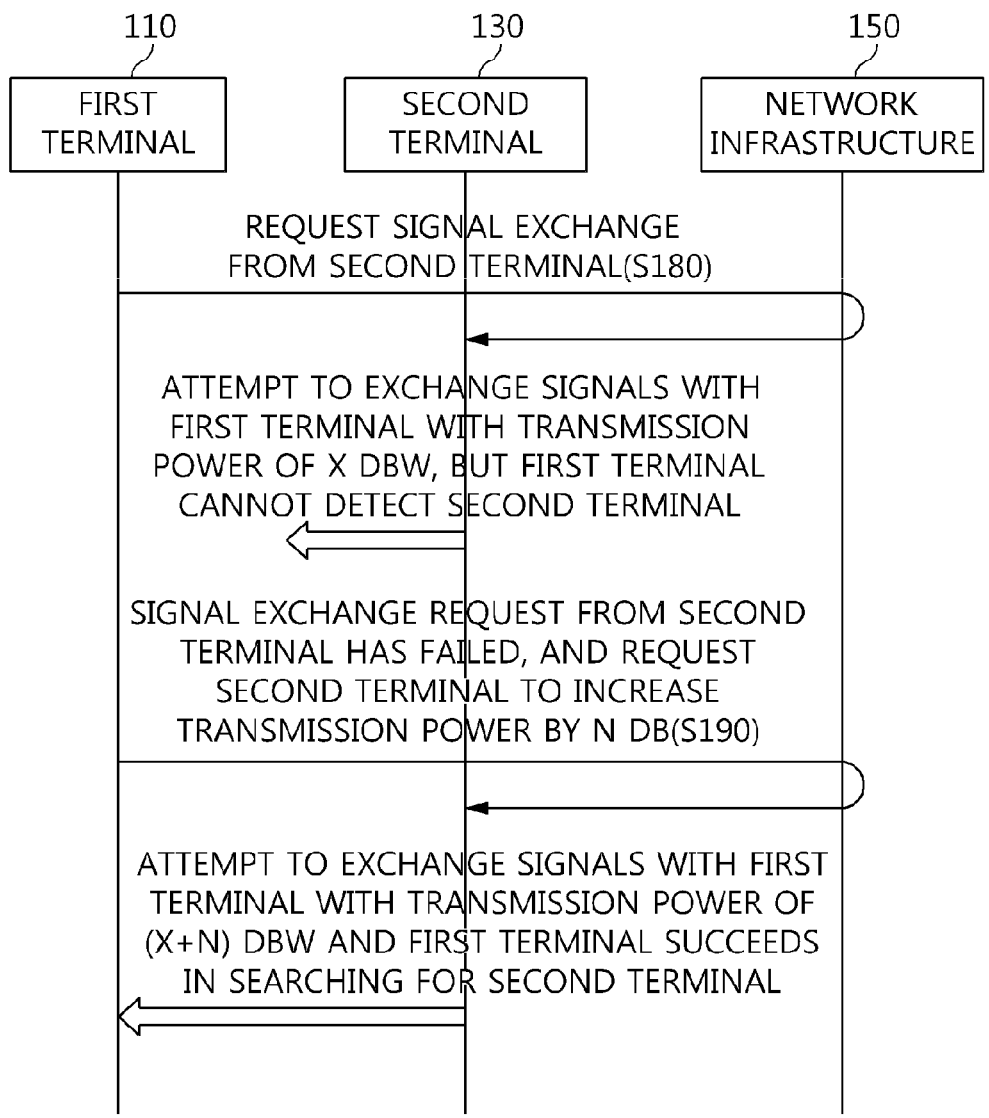
FIG. 5 is a diagram showing an identification signal transmission/reception process in the method of providing proximity service communication between terminals supporting multi-RATs according to the first embodiment of the present invention.

FIG. 5 is a flow diagram showing an identification signal transmission/reception process in the method of providing proximity service communication between terminals supporting multi-RATs according to the first embodiment of the present invention.

As shown in FIG. 5, the first terminal 110 may request signal exchange from the second terminal 130 via a network infrastructure 150, wherein transmission power may be set as X dBW at step S180. The network infrastructure 150 requests a network entity above a radio base station.

In this case, the second terminal 130 attempts to exchange signals with the first terminal 110 with a transmission power of X dBW, but the first terminal 110 may not detect the signal transmitted from the second terminal 130.

In this case, the first terminal 110 may determine that signal exchange that was requested from the second terminal 130 has failed and may request the second terminal 130 to increase the transmission power by N dB and to transmit a signal through the network infrastructure 150 at step S190.

Thus, the second terminal 130 transmits the signal to the first terminal 110 with a transmission power of (X+N) dBW, and the first terminal 110 may succeed in searching for the second terminal 130.

Via the above-described process, if direct communication technology between the first terminal 110 and the second terminal 130 has been determined at step S110, the network management server 100 may individually transmit a request message requesting a connection between the first terminal 110 and the second terminal 130 to the first terminal 110 and to the second terminal 130 at steps S120 and S130.

Each of the first terminal 110 and the second terminal 130 which receive the message may transmit a response message to the request message to the network management server 100 at steps S140 and S150.

In this case, when the request message is assumed to be a MIH_ProSe_Connection request message, the MIH_ProSe_Connection request message may include proximity service communication type (direct communication between terminals or locally routed communication via an identical base station) information (ProSe_Type), proximity service communication technology information (ProSe_Tech), counterpart terminal identifier information (ProSe_MNID) or radio base station identifier information (ProSe_PoAID), and information (ProSe_Config) required to search for the counterpart terminal or the radio base station.

Meanwhile, when the response message is assumed to be a MIH_ProSe_Connection response message, the MIH_ProSe_Connection response message includes success information obtained when a connection has succeeded and failure information obtained when a connection has failed.

If the MIH_ProSe_Connection response message is success information, direct communication between the first terminal 110 and the second terminal 130 is possible, and then direct data communication between the first terminal 110 and the second terminal 130 is performed.

Below, a second embodiment in which communication between terminals is performed in the second communication mode (locally routed communication via an identical base station) will be described in detail. For the convenience of description, a detailed description of contents identical to those of the first embodiment will be omitted here.

Figure 6:
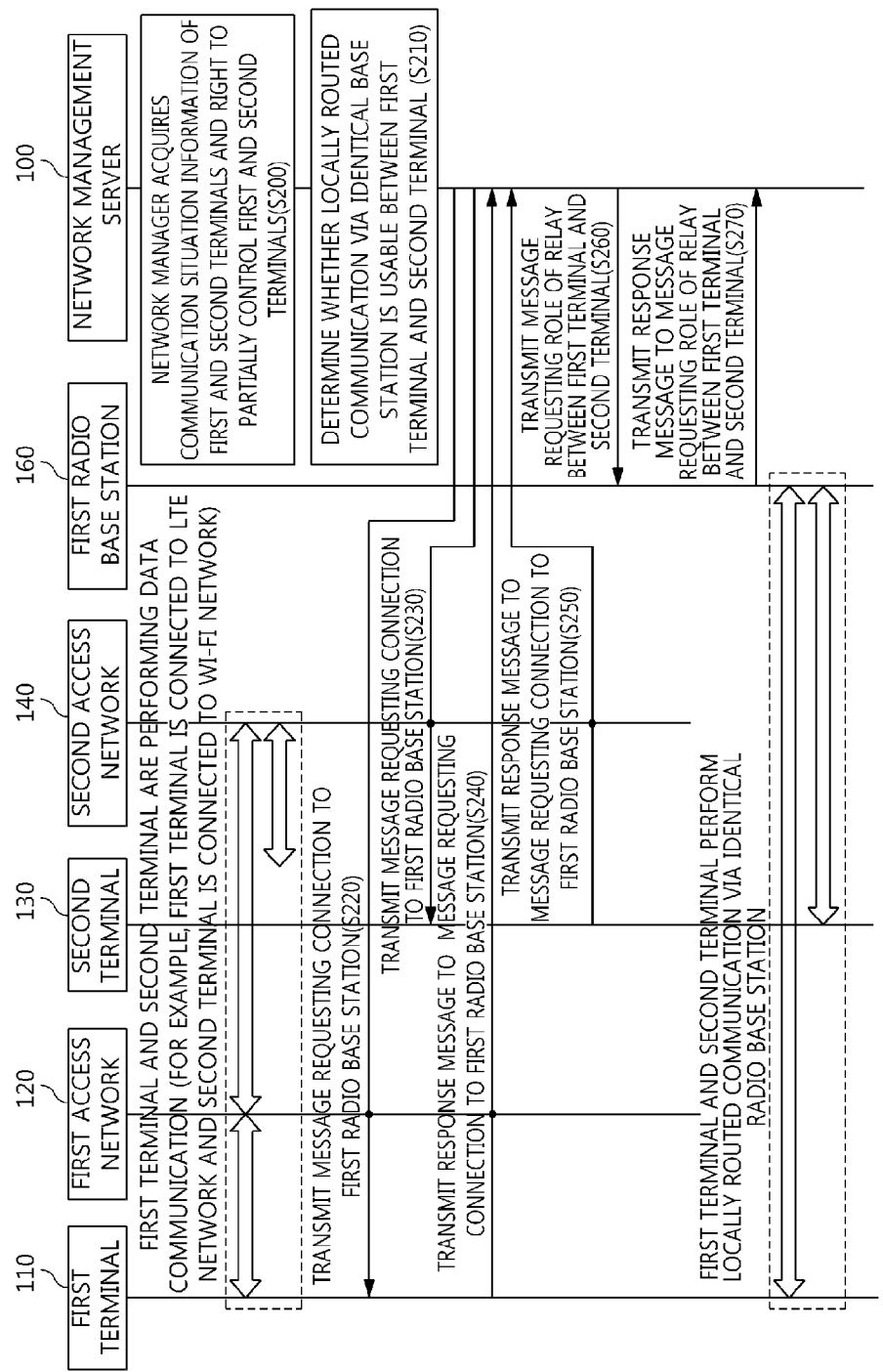
FIG. 6 is a flow diagram showing a method of providing proximity service communication between terminals supporting multi-RATs according to a second embodiment of the present invention.

FIG. 6 is a flow diagram showing a method of providing proximity service communication between terminals supporting multi-RATs according to a second embodiment of the present invention.

As shown in FIG. 6, the network management server 100 acquires communication situation information of the first terminal 110 and the second terminal 130 and the right to partially control the terminals at step S200.

Thereafter, the network management server 100 determines whether technology for locally routed communication via an identical base station is usable between the first terminal 110 and the second terminal 130 at step S210.

In this case, in order to determine to use locally routed communication between the terminals via the identical base station, the network management server 100 must determine whether the terminals can use technology for locally routed communication via the identical base station. For example, the first terminal and the second terminal 130 can perform locally routed communication via the identical base station only when the first terminal 110 and the second terminal 130 use the same ProSe technology.

The network management server 100 must be able to inquire of each terminal about which locally routed communication via the identical base station is used. In this case, as described above in the first embodiment, MIH_ProSe_TechList messages enabling proximity service communication technology used by the terminal (direct communication or locally routed communication via the identical base station) to be inquired about may be used.

Further, as described in the first embodiment, the network management server 100 may use the location information of each terminal so as to determine whether locally routed communication via the identical base station is usable between the terminals. Furthermore, as in the case of the first embodiment, the network management server 100 may determine locally routed communication via the identical base station between the terminals by additionally considering whether the locally routed communication via the identical base station will assist the improvement of communication quality, such as Quality of Service (QoS) or Quality of Experience (QoE).

If the network management server 100 determines to perform communication between the first terminal 110 and the second terminal 130 in the second communication mode (locally routed communication via the identical base station), the network management server 100 may individually transmit a connection request message to the first terminal 110 and to the second terminal 130 at steps S220 and S230. The first terminal 110 and the second terminal 130 that received the connection request message may individually transmit a response message to the connection request message to the network management server 100 at steps S240 and S250.

In this case, the request message requesting a connection to locally routed communication via the identical base station may be transmitted over heterogeneous networks which use different RAT in the network management server 100 or the terminals 110 and 130. For this, as MIH messages requesting direct communication between terminals and responding to the request, MIH_ProSe_Connection messages described in the first embodiment may be used.

Thereafter, the network management server 100 transmits a message requesting to assume the role of a relay between the first terminal 110 and the second terminal 130 to a first radio base station 160 at step S260. This message enables even a network which does not support locally routed communication via the identical radio base station to perform locally routed communication via an identical base station. However, the first radio base station 160 must play its original role, other than the role of a relay, except for communication between the first terminal 110 and the second terminal 130.

Here, a MIH_ProSe_Setup message is used as the above message, thus enabling the radio base station to assume the role of a message transfer relay between the terminals. This MIH_ProSe_Setup message is used to allow each terminal, the server or the radio base station to prepare for proximity service communication. This message includes proximity service communication type information (ProSe_Type), proximity service communication technology information (ProSe_Tech), identifier information of the counterpart terminal or the radio base station (ProSe_NodeID), and information required to search for the counterpart terminal or the radio base station (ProSe_Config).

For example, in the case of direct communication between terminals (ProSe_Type=1), the transfer target of a MIH_ProSe_Setup request message is the counterpart terminal, and the counterpart terminal prepares for data transmission and then responds to the request in the form of a MIH_ProSe_Setup response message.

In the case of locally routed communication via the identical base station (ProSe_Type=2), the transfer target of a MIH_ProSe_Setup request message is a radio base station, and the radio base station receives ProSe MNID, which is the identifier of the corresponding terminal, to prepare for locally routed communication via the identical base station. Messages that are transmitted and received by the terminals corresponding to ProSe_MNID are directly transferred by the radio base station.

In the case of communication with a server in an access network (ProSe_Type=3), the transfer target of the MIH_ProSe_Setup request message is server in an access network, and information to be transmitted together with this message is ProSe_PoAID which is the identifier of the radio base station. The server in an access network establishes a tunnel between the server in an access network and the radio base station using ProSe_PoAID.

Meanwhile, in the method of providing proximity service communication between terminals supporting multi-RATs according to the embodiment of the present invention, the network management server 100 must be able to provide the function of searching for counterpart terminals enabling communication to each terminal so as to provide proximity service communication between the terminals 110 and 130.

That is, the terminal and the counterpart terminal which is a target terminal must secure the same proximity and must use the same proximity service communication technology. Further, the counterpart terminal of the terminal must provide a service capable of meeting the user's requirement.

For example, there is a case where the user desires to receive specific video contents from the counterpart terminal, and in this case, the counterpart terminal must be able to provide a service for providing the video contents.

In addition to this example, when the user desires to search for the other party who knows region-specified information (for example, a method of visiting a place desired by the user), the counterpart terminal must be able to provide information desired by the user.

In this regard, a network user must be able to search for a counterpart terminal based on the location of the terminal, proximity service communication technology of the terminal, and the user's desired communication services.

For this operation, the embodiment of the present invention utilizes a scheme for providing the identifier of the counterpart terminal using a Media Independent Information Service (MIIS) server corresponding to the network management server 100 in IEEE 802.21 Media Independent Handover (MIH).

Figure 7:
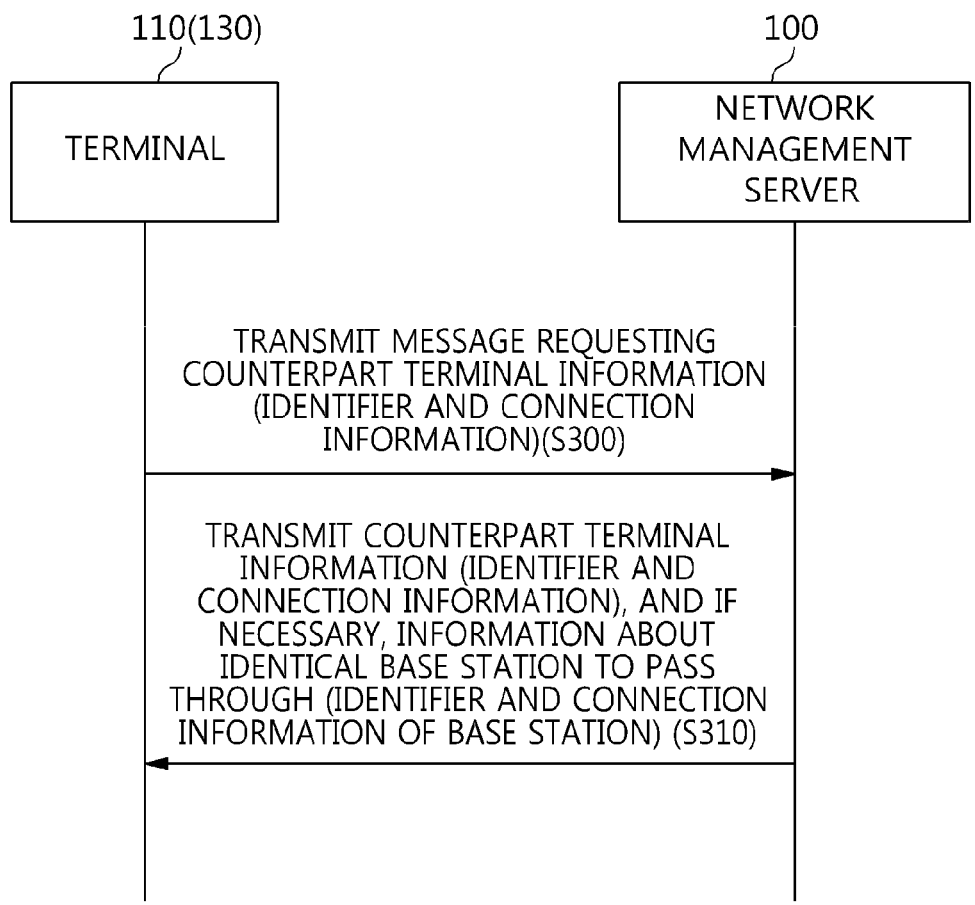
FIG. 7 is a flow diagram showing a terminal search method in the method of providing proximity service communication between terminals supporting multi-RATs according to the first and second embodiments of the present invention.

FIG. 7 is a flow diagram showing a terminal search method in the method of providing proximity service communication between terminals supporting multi-RATs according to the first and second embodiments of the present invention.

As shown in FIG. 7, the terminal 110 or 130 transmits a message requesting information about a counterpart terminal (identifier and connection information) to the network management server 100 at step S300. The message may include information on the location of the terminal, a list of proximity service communication technologies of the terminal, and communication service desired by a user.

The location information of the terminal is defined as QUERIER_LOC in the existing MIH. When the proximity service communication technology list of the user and the communication service desired by the user are defined as QUERIER_PROSE_TECHLIST and QUERIER_PROSE_SERVICE, the terminal may provide notification of the identification information of the counterpart terminal or information useful in searching for the counterpart terminal based on QUERIER_LOC, QUERIER_PROSE_TECHLIST, and QUERIER_PROSE_SERVICE.

Thereafter, the network management server 100 transmits the counterpart terminal information (identifier and connection information), and, if necessary, information about the identical base station to pass through (identifier and connection information of the base station) to the terminal 110 or 130 at step S310.

The counterpart terminal can be identified by using IE_CORR_ID, which includes the Media Access Control (MAC) or Internet Protocol (IP) address of the counterpart terminal, and IE_PROSE_CONFIG, which includes the frequency band and proximity service communication technology of the counterpart terminal.

In the case of locally routed communication between terminals via the identical base station (the second communication mode), information about the radio base station for locally routed communication via the identical base station may be implemented using a format defined in the existing MIH.

Meanwhile, in the first embodiment and the second embodiment, the step where the network management server 100 requests proximity service communication technology information supported by the first terminal 110 and the second terminal 130 from the first terminal 110 and the second terminal 130 has been described. However, as shown in FIG. 7, in a procedure in which the first terminal 110 searches for the second terminal 130 which is the counterpart terminal, the first terminal 110 provides proximity service communication technology information to the network management server 100, and thus a procedure for network management server 100 to request and receive the proximity service communication technology information of the first terminal 110 may be omitted.

In accordance with the method of providing proximity service communication between terminals supporting multi-RATs according to the embodiments of the present invention, a traffic load may be distributed even in a situation in which a network infrastructure such as only a radio base station is present, or even when no network infrastructure is present, by utilizing proximity communication supporting multi-RATs.

Further, by means of the simultaneous use of a network infrastructure and proximity service communication, the time required to switch between the use of a network infrastructure and the use of proximity service communication may be shortened.

Furthermore, proximity service communication between terminals may be selected by sharing a network infrastructure or proximity service communication technology supported by terminals.

Furthermore, a network infrastructure may be useful in selecting a terminal or a server suitable for a user's requirement.

Furthermore, information further satisfying the user's requirement may also be provided if a network structure, such as the Internet or a core network, is used.

Figure 8:
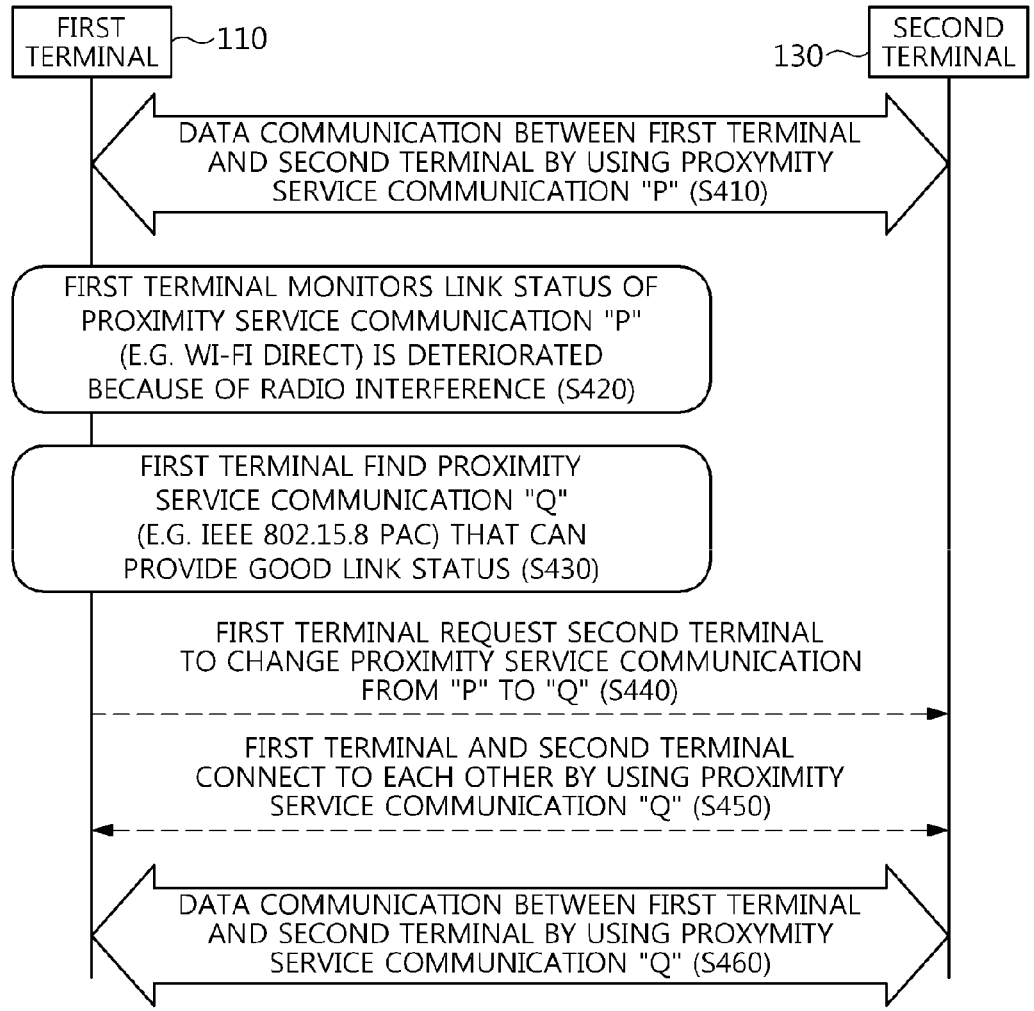
FIG. 8 shows switch of proximity service communication technology for terminals that are not assisted by any network entities.

FIG. 8 shows switch of proximity service communication technology for terminals that are not assisted by any network entities.

As shown in FIG. 8, the first terminal 110 or the second terminal 130 may use proximity service communication technology P (e.g., Wi-Fi Direct) for data communication, but QoS of proximity service communication technology P may decrease because of radio interference at step S410.

The first terminal 110 monitors that link status, which is status (e.g., signal strength and data rate) of physical layer and data link layer, of proximity service communication technology P is deteriorated because of radio interference at step S420. For monitoring link status of proximity service communication technology P at step S420, the first terminal 110 can use MIES (Media Independent Event Service) of IEEE 802.21-2008 standard.

The first terminal 110 finds proximity service communication technology Q (e.g., IEEE 802.15.8 PAC) which can provide good link status at step S430. For monitoring link status of proximity service communication technology Q at step S430, the first terminal 110 can use MIES (Media Independent Event Service) of IEEE 802.21-2008 standard.

The first terminal 110 requests the second terminal 130 to switch its proximity service communication technology from P to Q at step S440. For the switch of proximity service communication technology at step S440, MIH_ProSe_Connection request message can be used.

The first terminal 110 and the second terminal 130 can connect to each other by using proximity service communication technology Q at step S450.

The first terminal 110 and the second terminal 130 can communicate each other by using proximity service communication technology Q at step S460.

The advantages of the present invention are not limited to the above description, and other advantages, not described, will be more clearly understood from the above detailed description.

Although the preferred embodiments of the present invention have been disclosed for illustrative purposes, those skilled in the art will appreciate that various modifications, additions and substitutions are possible, without departing from the scope and spirit of the invention. Therefore, the detailed description should not be interpreted as being restrictive in all aspects and should be understood as being exemplary. Therefore, the technical scope of the present invention should be defined by the technical spirit of the accompanying claims, and all changes within the equivalent scope of the present invention should be included in the scope of the present invention.

What is claimed is:

1. A method of providing proximity service communication between terminals supporting proximity service communications, the method comprising:
receiving, by a network management server from a first terminal through a first access network, a search request including information required to search for a target terminal;

transmitting, by the network management server to the first terminal, information about a second terminal selected based on the information included in the search request, wherein the second terminal is connected to a second access network;

determining, by the network management server, a communication mode for proximity service communication between the first terminal and the second terminal, wherein determining the communication mode includes:

when the first terminal and the second terminal both have access to an identical base station, selecting as the communication mode a locally routed communication mode wherein communications between the first terminal and the second terminal are relayed using only the identical base station, and when direct wireless communications between the first terminal and the second terminal are possible, selecting as the communication mode a direct communication mode wherein the first terminal wirelessly communicates directly with the second terminal;

transmitting, by the network management server and through the first access network, a first request message to the first terminal, the first request message including a request to establish a communication using the communication mode between the first terminal and the second terminal;

transmitting, by the network management server and through the second access network, a second request message to the second terminal, the second request message including a request to establish the communication using the communication mode between the first terminal and the second terminal;

receiving a first response message to the first request message from the first terminal; and receiving a second response message to the second request message from second terminal, wherein the first access network is different from the second access network and the first access network and the second access network are networks using same or different radio access technologies.

2. The method of claim 1, wherein the first request message includes at least one of identifier information of the first terminal or the second terminal, information about the communication mode, information about proximity service communication technology between the first terminal and the second terminal, and identifier information of an identical base station.

3. The method of claim 2, further comprising:

requesting, by the network management server, information about proximity service communication technology supported by the first terminal and the second terminal from the first terminal and the second terminal;

receiving, by the network management server, the information about the proximity service communication technology supported by the first terminal and the second terminal from the first terminal and the second terminal; and determining, by the network management server, the communication mode between the first terminal and the second terminal, based on the received proximity service communication technology information.

4. The method of claim 1, further comprising, when the communication mode is the locally routed communication mode, transmitting, by the network management server, the second request message requesting communication relay between the first terminal and the second terminal to the identical base station that will relay communication between the first terminal and the second terminal; and receiving, by the network management server, the second response message corresponding to the second request message from the identical base station.

5. The method of claim 4, wherein the second request message includes identifier information of the first terminal and the second terminal.

6. The method of claim 1, wherein location information of the first terminal and the second terminal includes at least one of Global Positioning System (GPS) location information and identifier information of a radio base station to which the first and second terminals are connected.

7. The method of claim 6, wherein measurement results are generated by measuring strengths of the signals transmitted/received between the first terminal and the second terminal.

8. The method of claim 1, wherein the information required to search for the target terminal includes at least one of location information of the first terminal, information about proximity service communication technology of the first terminal, and service information requested by the first terminal.

9. The method of claim 1, wherein the information about the target terminal includes identifier information and access network information of the target terminal.

* * * * *